(12) United States Patent
Iwazaki

(10) Patent No.: US 7,720,595 B2
(45) Date of Patent: May 18, 2010

(54) ABNORMALITY DIAGNOSTIC DEVICE FOR AIR-FUEL RATIO SENSOR, AND CONTROL METHOD FOR THE DEVICE

(75) Inventor: Yasushi Iwazaki, Ebina (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 12/078,627

(22) Filed: Apr. 2, 2008

(65) Prior Publication Data

US 2008/0251057 A1 Oct. 16, 2008

(30) Foreign Application Priority Data

Apr. 12, 2007 (JP) ............... 2007-105274

(51) Int. Cl.
*G06F 19/00* (2006.01)
*G06G 7/70* (2006.01)

(52) U.S. Cl. .............. 701/114; 701/107; 701/109; 123/690; 123/198 D

(58) Field of Classification Search .......... 123/688, 123/690; 701/107, 109, 114; 702/116, 183, 702/185; 73/114.72, 114.73
See application file for complete search history.

(56) References Cited

U.S. PATENT DOCUMENTS

| | | | |
|---|---|---|---|
| 5,528,932 A * | 6/1996 | Bauer et al. ............. | 73/114.73 |
| 6,167,754 B1 * | 1/2001 | Koenders ................. | 73/114.73 |
| 6,287,453 B1 * | 9/2001 | Rosel et al. .............. | 205/783 |
| 2006/0155515 A1 * | 7/2006 | Buhl et al. ............... | 702/185 |
| 2006/0207560 A1 * | 9/2006 | Kobayashi ............... | 123/431 |

FOREIGN PATENT DOCUMENTS

| | | |
|---|---|---|
| JP | A-2004-360591 | 12/2004 |
| JP | A-2005-030358 | 2/2005 |
| JP | A-2006-118429 | 5/2006 |

\* cited by examiner

*Primary Examiner*—Stephen K Cronin
*Assistant Examiner*—Anthony L Bacon
(74) *Attorney, Agent, or Firm*—Oliff & Berridge, PLC

(57) ABSTRACT

An abnormality diagnostic device for an air-fuel ratio sensor that detects the air-fuel ratio of exhaust gas of an internal combustion engine is provided. The abnormality diagnostic device includes: a device that an device that models a system extending from a fuel injection valve to the air-fuel ratio sensor by using a first order response delay element and a waste time element, and that identifies at least a waste time of the waste time element based on an input given to the air-fuel ratio sensor and an output obtained from the air-fuel ratio sensor; and another device that performs determination about an abnormality of the waste time based on the identified waste time.

20 Claims, 11 Drawing Sheets

ABNORMALITY DIAGNOSTIC DEVICE FOR AIR-FUEL RATIO SENSOR, AND CONTROL METHOD FOR THE DEVICE

INCORPORATION BY REFERENCE

The disclosure of Japanese Patent Application No. 2007-105274 filed on Apr. 12, 2008 including the specification, drawings and abstract is incorporated herein by reference in its entirety.

BACKGROUND OF THE INVENTION

1. Field of the Invention

The invention relates to a device for diagnosing an abnormality of an air-fuel ratio sensor that detects the air-fuel ratio of exhaust gas of an internal combustion engine, and a method for the abnormality diagnosis.

2. Description of the Related Art

In an internal combustion engine equipped with an exhaust gas purification system that uses a catalyst, it is indispensable to control the mixing proportion between air and fuel in a mixture that is burned in the internal combustion engine, that is, the air-fuel ratio, in order to effectively remove harmful components of exhaust gas through the use of the catalyst. In order to perform such a control of the air-fuel ratio, an air-fuel ratio sensor that detects the air-fuel ratio on the basis of the concentration of a specific component of exhaust gas is provided on an exhaust passageway of the internal combustion engine, and a feedback control is carried out so as to bring the detected air-fuel ratio closer to a predetermined target air-fuel ratio.

Incidentally, if the air-fuel ratio sensor has an abnormality, such as degradation, a failure, etc., the air-fuel ratio feedback control cannot be accurately executed, so that the exhaust gas emission deteriorates. Therefore, diagnosis of abnormality of the air-fuel ratio sensor has been conventionally conducted. Particularly, in the case of engines mounted in motor vehicles, the detection of abnormality of the air-fuel ratio sensor in a vehicle-mounted state (on board) is required by laws or regulations or the like in many countries in order to prevent the motor vehicles from running while emitting deteriorated exhaust gas.

Japanese Patent Application Publication No. 2005-30358 (JP-A-2005-30358) discloses an abnormality detection device for an air-fuel ratio sensor that cyclically increases and decreases the air-fuel ratio through an open-loop control and that detects an abnormality of the air-fuel ratio sensor on the basis of the length or area of the locus of the air-fuel ratio sensor output that increases and decreases corresponding to the cyclical increases and decreases in the air-fuel ratio. Besides, Japanese Patent Application Publication No. 2004-360591 (JP-A-2004-360591) discloses that the system from the injection of fuel to the output of the air-fuel ratio sensor downstream of the catalyst is modeled, and a transfer function of this model is represented by a first order response delay element and a waste time element, and the air-fuel ratio feedback control gain is recursively changed on the basis of identified parameters (a proportional constant, a time constant of delay, a waste time) that are recursively identified in this model. The identified waste time is also used for the degradation diagnosis of the catalyst.

However, the technology described in Japanese Patent Application Publication No. 2005-30358 (JP-A-2005-30358), although being able to specifically determine abnormality of the air-fuel ratio sensor itself, is not able to specifically determine details of the abnormality. The technology described in Japanese Patent Application Publication No. 2004-360591 (JP-A-2004-360591) is intended to optimize the control gain of the air-fuel ratio feedback control, and is therefore able to perform the degradation diagnosis of the catalyst in association with the optimization, but is not able to perform diagnosis of abnormality of the air-fuel ratio sensor.

Incidentally, with regard to abnormality of the air-fuel ratio sensor, there is a problem of mis-installation in which the mount position of the sensor is mistaken at the time of mounting or replacing the sensor. If this mis-installation occurs, inability to execute a required air-fuel ratio control results and the exhaust gas emission deteriorates, as in the case where the sensor itself is abnormal.

SUMMARY OF THE INVENTION

The invention relates to an abnormality diagnostic device for an air-fuel ratio sensor which is capable of detecting a mis-installation of the air-fuel ratio sensor, and also to a method for the abnormality diagnostic device.

A first aspect of the invention is an abnormality diagnostic device for an air-fuel ratio sensor that detects an air-fuel ratio of an exhaust gas of an internal combustion engine. The device includes: an identification unit that models a system extending from a fuel injection valve to the air-fuel ratio sensor by using a first order response delay element and a waste time element, and that identifies at least a waste time of the waste time element based on an input given to the air-fuel ratio sensor and an output obtained from the air-fuel ratio sensor; and an abnormality determination unit that performs determination about an abnormality of the waste time based on the waste time identified by the identification unit.

If the installation position of the air-fuel ratio sensor is mistaken, the exhaust passageway length from the combustion chamber to the air-fuel ratio sensor changes, so that the waste time changes more greatly than during a normal state. Hence, by identifying (or estimating) the actual waste time on the basis of the input and the output and performing determination about abnormality of the waste time, the mis-installation of the air-fuel ratio sensor can be detected.

In the first aspect, the identification unit also may identify a parameter of the first order response delay element based on the input and the output, and the abnormality determination unit may perform determination also about an abnormality of a predetermined characteristic of the air-fuel ratio sensor based on the parameter identified by the identification unit.

This construction detects not merely abnormality of the air-fuel ratio sensor, but detects abnormality of a predetermined characteristic of the air-fuel ratio sensor. Hence, it can be determined which of a plurality of characteristics of the air-fuel ratio sensor is abnormal, and the diagnosis of abnormality of the air-fuel ratio sensor can be more closely and minutely executed.

The abnormality determination unit may perform determination about abnormalities of at least two of characteristics of the air-fuel ratio sensor based on at least two parameters identified by the identification unit.

With this construction, since abnormality determination is performed about at least two of the characteristics of the air-fuel ratio sensor, abnormalities of the at least two characteristics can be individually determined. Thus, the abnormality diagnostic device can be made very suitable for the abnormality diagnosis of the air-fuel ratio sensor.

The at least two parameters may be a gain and a time constant, and the at least two characteristics of the air-fuel ratio sensor may be the output and a response rate.

Of the characteristics of the air-fuel ratio sensor, the output and the response rate are important characteristics that influence the performance of the sensor. According to the foregoing aspect, since abnormalities of at least two important characteristics can be diagnosed, the abnormality diagnostic device is very suitable for the abnormality diagnosis of the air-fuel ratio sensor.

The identification unit may simultaneously identify the waste time of the waste time element, and the gain and the time constant of the first order response delay element.

The abnormality determination unit may perform determination about the abnormality of the waste time based on the identified waste time, and may simultaneously perform determination about abnormalities of the output and the response rate of the air-fuel ratio sensor based on the identified gain and the identified time constant.

According to the foregoing aspects, the identification of three parameters and the determination about three abnormalities can be simultaneously and efficiently performed.

In the first aspect, the abnormality diagnostic device may further include a bias correction unit that corrects at least one of the input and the output so as to remove a bias between the input and the output.

Therefore, the robustness to load fluctuation, learning deviation, etc. can be improved.

The abnormality diagnostic device may further include: an active control unit that executes an active control of compulsorily oscillating the input; and a delayed sampling unit that samples post-bias-correction input/output data provided during the active control, starting at a time point of elapse of a predetermined time following a start time of the active control, and the identification unit may identify the waste time based on the input/output data sampled by the delayed sampling unit.

According to this construction, the initial data immediately following the start of the active control that may often adversely affect the identified value, and the robustness of the identified value can be improved.

The abnormality diagnostic device may further include: an active control unit that executes an active control of compulsorily oscillating the input; and an increase correction unit that performs an increase correction of post-bias-correction input/output data provided during the active control, and the identification unit may identify the waste time based on the input/output data that is increase-corrected by the increase correction unit.

Therefore, the influence of noise can be reduced, and the accuracy and robustness of the identified value can be improved.

In the first aspect, the abnormality diagnostic device may include a fuel correction unit that corrects the input based on a wall surface-attached amount of fuel and an evaporation amount of fuel.

This makes it possible to improve the identification accuracy.

According to the foregoing aspect of the invention, an excellent effect of being able to suitably detect the mis-installation of the air-fuel ratio sensor can be achieved.

A second aspect of the invention is an abnormality diagnostic method for an air-fuel ratio sensor that detects an air-fuel ratio of an exhaust gas of an internal combustion engine. The method includes: modeling a system extending from a fuel injection valve to the air-fuel ratio sensor by using a first order response delay element and a waste time element; identifying at least a waste time of the waste time element based on an input given to the air-fuel ratio sensor and an output obtained from the air-fuel ratio sensor; and performing determination about an abnormality of the waste time based on the waste time identified.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described hereinafter with reference to the accompanying drawings.

Figure 1:
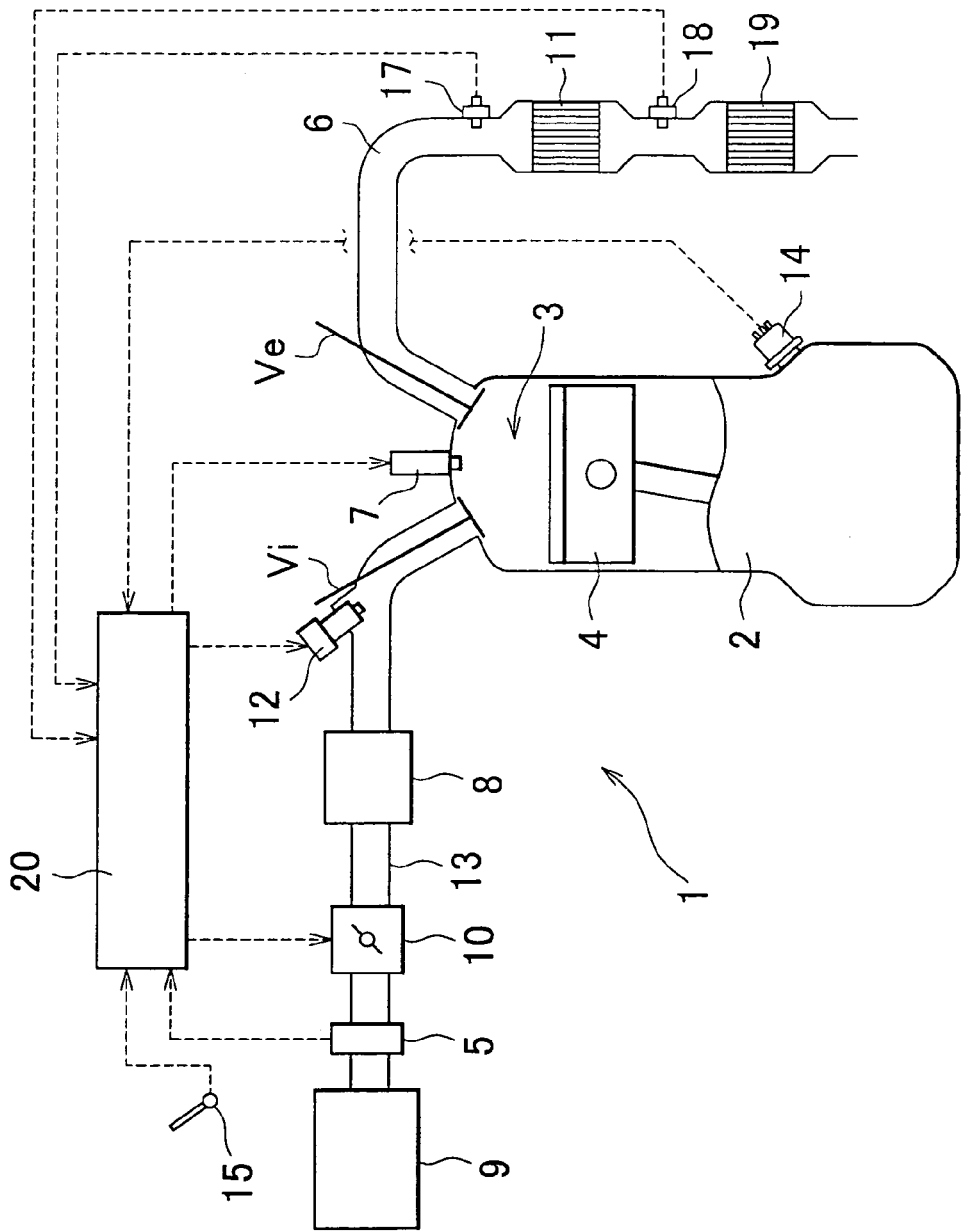
FIG. 1 is a schematic diagram of an internal combustion engine in accordance with an embodiment of the invention.

FIG. 1 is a schematic diagram of an internal combustion engine in accordance with an embodiment of the invention. As shown in FIG. 1, an internal combustion engine 1 produces power by burning a mixture of fuel and air within a combustion chamber 3 formed in a cylinder block 2 and therefore reciprocating a piston 4 within the combustion chamber 3. The internal combustion engine 1 of this embodiment is a vehicle-purpose multicylinder engine (e.g., a four-cylinder engine, although only one cylinder is shown), and is a spark ignition type internal combustion engine, more specifically, a gasoline engine.

In a cylinder head of the internal combustion engine 1, intake valves Vi that open and close intake ports and exhaust valves Ve that open and close exhaust ports for the individual cylinders are arranged separately for the individual cylinders. The intake valves Vi and the exhaust valves Ve are opened and closed by camshafts. Besides, ignition plugs 7 for igniting the mixture in the combustion chambers 3 are attached to a top portion of the cylinder head separately for the individual cylinders.

The intake ports of the cylinders are connected to a surge tank 8 that is an intake air collective chamber via branch pipes provided for the individual cylinders. An intake pipe 13 that forms an intake collective passageway is connected to a upstream side of the surge tank 8. An air cleaner 9 is provided on an upstream end of the intake pipe 13. An air flow meter 5 for detecting the intake air amount and an electronically controlled throttle valve 10 are installed in the intake pipe 13 in that order from the upstream end. The intake ports, the branch pipes, the surge tank 8 and the intake pipe 13 form an intake passageway.

An injector (fuel injection valve) 12 that injects fuel into the intake passageway and, in particular, into the intake port, is disposed for each cylinder. The fuel injected from the injector 12 is mixed with intake air to form a mixture. The mixture is taken into the combustion chamber 3 when the intake valve Vi is opened. Then, the mixture is compressed by the piston 4, and is ignited to burn by the ignition plug 7.

On the other hand, the exhaust ports of the individual cylinders are connected, via branch pipes provided separately for the individual cylinders, to an exhaust pipe 6, which forms an exhaust collective passageway. The exhaust port, the branch pipes and the exhaust pipe 6 form an exhaust passageway. Catalysts 11, 19 that are each made up of a three-way catalyst are attached to an upstream side and a downstream side of the exhaust pipe 6. Air-fuel ratio sensors 17, 18 for detecting the air-fuel ratio of exhaust gas, specifically, a pre-catalyst sensor 17 and a post-catalyst sensor 18, are disposed at a position preceding the upstream-side catalyst 11 and a position subsequent thereto, respectively. The pre-catalyst sensor 17 and the post-catalyst sensor 18 detect the air-fuel ratio on the basis of the oxygen concentration in exhaust gas. The pre-catalyst sensor 17 is made up of a so-called wide-range air-fuel ratio sensor, and is capable of detecting the air-fuel ratio continuously over a relatively wide range, and outputs an electric current signal that is proportional to the detected air-fuel ratio. On the other hand, the post-catalyst sensor 18 is made up of a so-called $O_2$ sensor, and has a characteristic of the output voltage changing sharply at the stoichiometric air-fuel ratio.

The ignition plugs 7, the throttle valve 10, the injectors 12, etc. that are mentioned above are electrically connected to an electronic control unit (hereinafter, referred to as ECU) that is provided as control means. The ECU 20 includes a CPU, a ROM, a RAM, input/output ports, a storage device, etc. (none of which is shown). As shown in FIG. 1, various sensors and the like are connected to the ECU 20 via A/D converters and the like, including the air flow meter 5, the pre-catalyst sensor 17 and the post-catalyst sensor 18, and also including a crank angle sensor 14 that detects the crank angle of the internal combustion engine 1, an accelerator operation amount sensor 15 that detects the accelerator operation amount, and other various sensors. On the basis of the detected values or the like from the various sensors, the ECU 20 controls the ignition timing, the amount of fuel injection, the fuel injection timing, the degree of throttle opening, etc. by controlling the ignition plugs 7, the throttle valve 10, the injectors 12, etc., in such a manner that desired output is obtained. Ordinarily, the degree of throttle opening is controlled to a degree of opening that is according to the accelerator operation amount.

The catalysts 11, 19 simultaneously purify NOx, HC and CO when the air-fuel ratio A/F of the exhaust gas flowing into the catalysts is a stoichiometric air-fuel ratio (e.g., A/F=14.6). Correspondingly, the ECU 20 controls the air-fuel ratio so that the air-fuel ratio A/F of the exhaust gas flowing into the catalysts 11, 19 becomes equal to the stoichiometric air-fuel ratio (so-called stoichiometric control) during an ordinary operation of the internal combustion engine. Concretely, the ECU 20 sets a target air-fuel ratio A/Ft equal to the stoichiometric air-fuel ratio, and calculates such a basic fuel injection amount that the air-fuel ratio of the mixture flowing into the combustion chamber 3 becomes equal to the target air-fuel ratio A/Ft. Then, the basic injection amount is feedback-corrected according to the difference between the target air-fuel ratio A/Ft and an actual air-fuel ratio detected by the pre-catalyst sensor 17, and the injector 12 is electrified (turned on) for an energization time according to the post-correction injection amount. As a result, the air-fuel ratio of the exhaust gas supplied to the catalysts 11, 19 is kept in the vicinity of the stoichiometric air-fuel ratio, so that the catalysts 11, 19 deliver maximum purification performance. In this manner, the ECU 20 feedback-controls the air-fuel ratio (fuel injection amount) so that the actual air-fuel ratio detected by the pre-catalyst sensor 17 approaches the target air-fuel ratio A/Ft. Incidentally, the post-catalyst sensor 18 is provided for correcting the deviation in the air-fuel ratio in the air-fuel ratio feedback control.

Next, an abnormality diagnosis of the air-fuel ratio sensor in the embodiment will be described. The object of diagnosis in this embodiment is the air-fuel ratio sensor disposed upstream of the upstream-side catalyst 11, that is, the pre-catalyst sensor 17.

In the abnormality diagnosis, the system extending from the injectors 12 to the pre-catalyst sensor 17 is modeled using a first order response delay element and a waste time element, and a waste time of the waste time element is identified (estimated) on the basis of the input given to the pre-catalyst sensor 17 and the output obtained from the pre-catalyst sensor 17. Then, on the basis of the identified waste time, determination regarding abnormality of the waste time is performed.

As an input, a ratio Ga/Q between a fuel injection amount Q calculated on the basis of the energization time of the injector 12 and an intake air amount Ga calculated on the basis of the output of the air flow meter 5, that is, an input air-fuel ratio A/Fin, is used. Hereinafter, the input is represented by $u(t)$ ($u(t)$=A/Fin=Ga/Q). On the other hand, as an output, an air-fuel ratio converted from the output electric current value of the pre-catalyst sensor 17, that is, an output air-fuel ratio A/Fout, is used. Hereinafter, the output is represented by $y(t)$ ($y(t)$=A/Fout). From the manner in which the output $y(t)$ is produced when the input $u(t)$ is given to the pre-catalyst sensor 17, a waste time is identified. On the basis of this identified waste time, it is determined whether or not the waste time is abnormal.

In addition to this, in this embodiment, a parameter in the first order response delay element is identified (estimated) on the basis of the input and the output. Then, on the basis of the identified parameter, it is determined whether- or not a predetermined characteristic of the pre-catalyst sensor 17 is abnormal.

Figure 2:
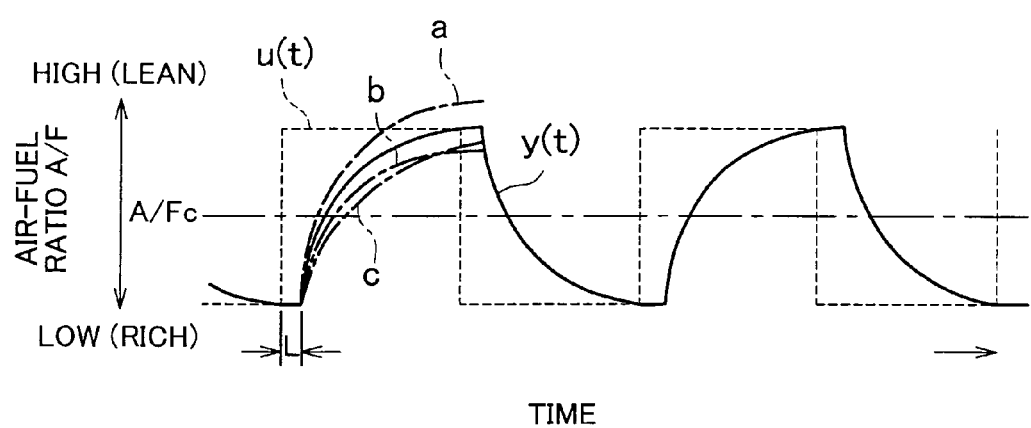
FIG. 2 is a diagram schematically showing the manners of changes in the input and the output during an active control.

As shown in FIG. 2, in this embodiment, at the time of determination regarding the abnormality diagnosis of an air-fuel ratio sensor, an active control of compulsorily oscillating the input $u(t)$ is executed. In this active control, the target air-fuel ratio A/Ft and therefore the input $u(t)$ are oscillated at a fixed period so as to oscillate with equal widths of oscillation (equal amplitudes) to the lean side and the rich side from a predetermined center air-fuel ratio A/Fc. In connection with this, the air-fuel ratio detected by the pre-catalyst sensor 17, that is, the output $y(t)$, is oscillated so as to follow the oscillation of the input $u(t)$. The central air-fuel ratio A/Fc of the oscillation of the target air-fuel ratio A/Ft and the input $u(t)$ is made equal to the stoichiometric air-fuel ratio, and the amplitude of the oscillation is made larger than that occurring in an ordinary air-fuel ratio control, and is set at, for example, 0.5 in terms of the air-fuel ratio.

A reason for executing the active control at the time of the abnormality diagnosis is that the execution of the active control changes the air-fuel ratio more greatly and sharply than during an ordinary state, and therefore facilitates performance of the abnormality diagnosis of the pre-catalyst sensor 17. Besides, since the active control is executed during steady operation of the engine, the various control quantities and various detection values become stable, and the accuracy of the diagnosis improves. However, the abnormality diagnosis may also be executed during an ordinary air-fuel ratio control.

As shown in FIG. 2, the input u(t) has a step-like waveform while the output y(t) has a waveform with a first order response delay. In FIG. 2, L shows a waste time based on the transportation delay from the input u(t) to the output y(t). That is, the waste time L corresponds to the time difference between the combustion of a mixture present in the combustion chamber 3 in the cylinder and the time at which the exhaust gas resulting from the combustion reaches the pre-catalyst sensor 17. Practically, the start time point of the waste time L may be set at, for example, the time of ignition or the time of opening of the exhaust valve. Since the time from the ignition time to the exhaust valve opening time is very short in comparison with the whole waste time, setting the start time point at either one of the ignition time and the exhaust valve opening time poses no particular problem in accuracy.

The system extending from the injector 12 to the pre-catalyst sensor 17 can be modeled by a transfer function: $G(s)=(K/(1+Ts))\cdot e^{-sL}$, which is the multiplication product of a first order response delay element $G_1(s)=K/(1+Ts)$ and a waste time element $G_2(s)=e^{-sL}$. In the expression of the transfer function, K is the gain of the pre-catalyst sensor 17, and T represents a time constant of the pre-catalyst sensor 17. The gain k is a parameter related to the output of the pre-catalyst sensor 17, among the characteristics thereof. On the other hand, the time constant T is a parameter related to the response rate of the pre-catalyst sensor 17, among the characteristics thereof. In FIG. 2, a solid line representing the output y(t) shows the case where the pre-catalyst sensor 17 is normal. If an abnormality occurs in the output characteristic of the pre-catalyst sensor 17, the gain K becomes greater than during a normal state, so that the sensor output increases (enlarges) as shown by a line a, or the gain K becomes smaller than during the normal state, so that the sensor output decreases (shrinks) as shown by a line b. Therefore, by comparing the identified gain K with a predetermined value, it can be specifically determined whether there is an increase abnormality or a decrease abnormality in the sensor output. On the other hand, if an abnormality occurs in the response rate of the pre-catalyst sensor 17, the time constant T, in most cases, becomes greater than during a normal state, so that the sensor output is produced with a delay as shown by a line c. Therefore, by comparing the identified time constant T with a predetermined value, the ECU 20 can perform specific determination regarding abnormality of the response rate of the sensor.

Besides the abnormality of the pre-catalyst sensor 17, there is an abnormality termed a mis-installation in which the mount position of the pre-catalyst sensor 17 is mistaken at the time of mounting or replacing the pre-catalyst sensor 17. An example of the mis-installation is a case where the pre-catalyst sensor 17 is mounted to a hole provided for the post-catalyst sensor 18. If the mis-installation occurs, a sensor output that is not originally expected is input to the ECU side, resulting in inability to execute a required air-fuel ratio control and in deterioration of exhaust gas emission as in the case where the sensor itself is abnormal. Furthermore, even in the case where the pre-catalyst sensor 17 is installed at the normal position, an abnormality sometimes occurs in the exhaust passageway on the upstream side of the pre-catalyst sensor 17, and the sensor output is input to the ECU 20 later (or earlier on a rare occasion) than during the normal state. In such a case, too, a required air-fuel ratio control is impeded, and therefore the exhaust gas emission deteriorates. There also sometimes occurs a case where the pre-reaction time from the contact of the gas with the sensor to the production of a sensor output is prolonged due to sensor degradation. In that case, the sensor itself is abnormal, which is a problem particularly with a so-called $O_2$ sensor such as the post-catalyst sensor 18.

The present inventors focused attention on the fact that the aforementioned abnormalities all affect the waste time, and then found that such abnormalities can be detected by identifying the actual waste time. For example, in the case where the pre-catalyst sensor 17 is mistakenly installed at a position that is relatively far from the combustion chamber 3, the waste time becomes longer than during the normal state. In the case where the pre-catalyst sensor 17 is mistakenly installed at a position that is relatively near to the combustion chamber 3, the waste time becomes shorter than during the normal state. Besides, if an abnormality occurs on the upstream side of the pre-catalyst sensor 17 and therefore the state of passage of exhaust gas changes, the waste time changes more greatly than during a normal waste time. If the pre-reaction time of the pre-catalyst sensor 17 is prolonged due to sensor degradation, the waste time also becomes longer than during the normal state. Therefore, by comparing the identified waste time with a predetermined abnormality criterion value, an abnormality of the waste time can be detected, and therefore the aforementioned abnormalities related to the pre-catalyst sensor 17, including the mis-installation and the like, can be detected.

In this embodiment, three parameter, that is, the waste time L, the gain K and the time constant T, are simultaneously identified, and determination is performed simultaneously with regard to the three abnormalities, that is, abnormality of the waste time, abnormality of the sensor output and abnormality of the sensor response rate that respectively correspond to the three parameters. Hence, these abnormalities can be simultaneously and individually diagnosed.

Next, the identification of the waste time L, the gain K and the time constant T executed by the ECU 20 will be described.

As described above, the transfer function G(s) of the system from the injector 12 to the pre-catalyst sensor 17 is expressed as in the following equation (1).

$$G(s) = \frac{K}{1+Ts} \cdot e^{-sL} \quad (1)$$

If the Laplace transforms of the input u(t) and the output y(t) with respect to this system are represented as U(s) and Y(s), the following equation (2) is satisfied.

$$\frac{Y(s)}{U(s)} = \frac{K}{1+Ts} \cdot e^{-sL} \quad (2)$$

Taking the natural logarithm on both sides of the equation (2) give the following equation (3):

$$\ln(Y(s)/U(s)) = \ln K - \ln(1+Ts) - sL \quad (3)$$

By the way, for example, the Laplace transform U(s) of the input u(t) is expressed by the following equation (4):

$$U(s) = \int_{-\infty}^{\infty} u(t) \cdot e^{-st} dt \quad s \in C \tag{4}$$

In the equation, C is a complex number, and s∈C means that S is an element of C. Since the real number R is a subset of the complex number C, the equation (2) is satisfied even if s is selected as a real number. Therefore, if on the assumption that s=σ (σ>0, σ∈R) is sufficiently small to satisfy Tσ≈0, ln(1+Tσ) is Taylor-expanded to give:

$$\ln(1 + T\sigma) = \sum_{n=1}^{\infty} \frac{(-1)^{n+1}}{n} (T\sigma)^n \tag{5}$$

the equation (3) can be rewritten as follows:

$$\begin{aligned}\ln(Y(\sigma)/U(\sigma)) &= \ln K - \sigma L - \ln(1 + T\sigma) \\ &= \ln K - \sigma L - \\ & \quad \left\{ T\sigma - \frac{T^2}{2}\sigma^2 + \frac{T^3}{3}\sigma^3 - \frac{T^4}{4}\sigma^4 + \frac{T^5}{5}\sigma^5 \ldots \right\} \\ &= \ln K - (L+T)\sigma + \frac{T^2}{2}\sigma^2 - \frac{T^3}{3}\sigma^3 + \frac{T^4}{4}\sigma^4 - \frac{T^5}{5}\sigma^5 \ldots \end{aligned} \tag{6}$$

To actually carry out the identification from measured input/output data by the least squares method, the equation (6) is cut off at a finite term, for example, up to the quartic term, and the regressor vector φ and the parameter vector θ are given as in:

$$\varphi(\sigma) = \begin{bmatrix} 1 & -\sigma & \sigma^2 & -\sigma^3 & \sigma^4 \end{bmatrix} \tag{7}$$

$$\theta = \begin{bmatrix} \ln K & L+T & \frac{T^2}{2} & \frac{T^3}{3} & \frac{T^4}{4} \end{bmatrix}^T$$

Then, the equation (6) is rearranged as follows:

$$\varphi(\sigma) \cdot \theta = \ln \frac{Y(\sigma)}{U(\sigma)} \tag{8}$$

Next, the equations obtained from the equation (8) for M number of mutual different values $\sigma_i$ (i=1, ..., M) are arranged in an extended matrix equation as follows:

$$\begin{bmatrix} \varphi(\sigma_1) \\ \varphi(\sigma_2) \\ \vdots \\ \varphi(\sigma_M) \end{bmatrix} \cdot \theta = \begin{bmatrix} \ln \frac{Y(\sigma_1)}{U(\sigma_1)} \\ \ln \frac{Y(\sigma_2)}{U(\sigma_2)} \\ \vdots \\ \ln \frac{Y(\sigma_M)}{U(\sigma_M)} \end{bmatrix} \tag{9}$$

$$\Rightarrow \Phi \cdot \theta = \Gamma \tag{10}$$

Thus, by the least squares method, an estimated value $\hat{\theta}$ of the parameter vector can be found as:

$$\hat{\theta} = (\Phi^T \Phi)^{-1} \Phi^T \Gamma \tag{11}$$

Furthermore, from the $\hat{\theta}$ element, an estimated value of K/T/L can be found. Incidentally, as for the real number Laplace-transformed values $Y(\sigma_i)$, $U(\sigma_i)$ in the matrix Γ, the Laplace transform formula (4) is approximated by the adding calculation of N number of finite sample data.

Assuming that the signal is u(t)=0 (t<0), an approximate expression of the Laplace transform can be obtained as follows:

$$\begin{aligned} U(\sigma) &= \int_{-\infty}^{\infty} u(t) \cdot e^{-\sigma t} dt \\ &\cong \int_0^{\Delta N} u(t) \cdot e^{-st} dt \\ &\cong \sum_{i=1}^{N} u[i] \cdot e^{-\sigma \Delta i} \cdot \Delta \end{aligned} \tag{12}$$

In this equation, Δ is the sampling time, u[i]=u(Δ·i) (i=1, ...) is a sample data row. Similarly, the following approximate expression is used for Y $$Y(\sigma) \cong \sum_{i=1}^{N} y[i] \cdot e^{-\sigma \Delta i} \cdot \Delta \tag{13}$$

Since the elements of $\hat{\theta}$ are redundant, the elements can be set as follows:

$$\hat{\theta} = [\hat{\theta}_1 \hat{\theta}_2 \hat{\theta}_3 \hat{\theta}_4 \hat{\theta}_5] \tag{14}$$

Then, from the relationship of the equation (7), the following equations are given.

$$K = e^{\hat{\theta}_1}$$

$$T_a = (2\theta_3)^{1/2}$$

$$T_b = (3\theta_4)^{1/3}$$

$$T_c = (4\theta_5)^{1/4} \tag{15}$$

$$L_a = \theta_2 - \hat{T}_a$$

$$L_b = \theta_2 - \hat{T}_b$$

$$L_c = \theta_2 - \hat{T}_c$$

As can be understood from the equation (15), only one identified value of the gain K is determined, while there are three candidates $T_a$ to $T_c$ and $L_a$ to $L_c$ for the time constant T and the waste time L, respectively. Practically, taking into account the cut-off error, the numerical value calculation error, etc., one value is selected beforehand from each of the groups $T_a$ to $T_c$ and $L_a$ to $L_c$ such that an appropriate fixed value can be calculated, and is adopted as a final fixed value. For example, K, $T_a$ and $L_a$ become a combination of the gain, the time constant and the waste time that are finally identified. Incidentally, the candidates for the fixed values of the time constant T and the waste time L change according to the cut-off degree of order in the equation (6). In this example, the equation is cut off up to the quartic term and three candidates are obtained. However, for example, if the equation is cut off up to the cubic term, two candidates are obtained. If the equation is cut off up to the quadratic term, only one candidate is determined.

In the foregoing identification, the input/output values are sequentially stored in a buffer of the ECU 20 at every sampling time, and at the time point where a predetermined number of data are accumulated, all of these data are used to simultaneously identify the gain K, the time constant T and the waste time L through the use of the foregoing calculation and the least squares method.

Using the gain K, the time constant T and the waste time L identified in this manner, the abnormality determination is performed in the following fashion by the ECU 20. Firstly, in the case where the identified time constant T is greater than a predetermined time constant abnormality criterion value Ts, it is determined that a response delay has occurred and therefore the pre-catalyst sensor 17 has a response rate abnormality. On the other hand, in the case where the identified time constant T is less than or equal to the time constant abnormality criterion value Ts, it is determined that the pre-catalyst sensor 17 is normal in terms of the response rate.

Furthermore, in the case where the identified gain K is greater than a predetermined gain increase abnormality criterion value Ks1, it is determined that the pre-catalyst sensor 17 has an output increase abnormality. In the case where the identified gain K is smaller than a gain reduction abnormality criterion value Ks2 (<Ks1), it is determined that the pre-catalyst sensor 17 has an output decrease abnormality. In the case where the identified gain K is greater than or equal to the gain reduction abnormality criterion value Ks2 and is less than or equal to the gain increase abnormality criterion value Ks1, it is determined that the pre-catalyst sensor 17 is normal in terms of output.

Furthermore, in the case where the identified waste time L is greater than a predetermined waste time increase abnormality criterion value Ls1, it is determined that the waste time has an increase abnormality. In the case where the identified waste time L is smaller than a predetermined waste time shrink abnormality criterion value Ls2 (<Ls1), it is determined that the waste time has a decrease abnormality. In the case where the identified waste time L is greater than or equal to the waste time shrink abnormality criterion value Ls2, and is less than or equal to the waste time increase abnormality criterion value Ls1, it is determined that the waste time is normal.

According to the abnormality diagnosis in accordance with the embodiment, abnormality of the waste time related to the air-fuel ratio sensor can be suitably detected. Furthermore, an abnormality, such as mis-installation or the like, that becomes a factor of the waste time abnormality can also be suitably detected. Besides, not only the abnormality of the air-fuel ratio sensor itself, but abnormalities of individual characteristics of the air-fuel ratio sensor (the output and the response rate thereof) can also be suitably detected. Then, the abnormalities of these three characteristics, that is, the three abnormalities, can be simultaneously and individually detected. Therefore, a very suitable diagnosis of abnormalities of the air-fuel ratio sensor can be realized.

Figure 3A:
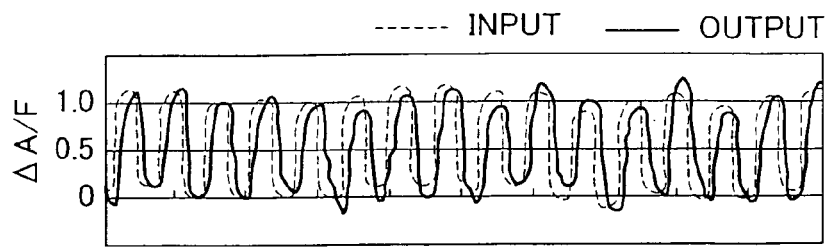
FIGS. 3A to 3D are graphs showing results of identification of the gain, the time constant and the waste time.

FIGS. 3A to 3D show results of the identification of the gain K, the time constant T and the waste time L regarding a normal pre-catalyst sensor 17. FIG. 3A shows the input (interrupted line) and the output (solid line) that are compulsorily oscillated by the active control. Incidentally, the input and the output shown in FIGS. 3A to 3D are values obtained after corrections described below.

Figure 3B:
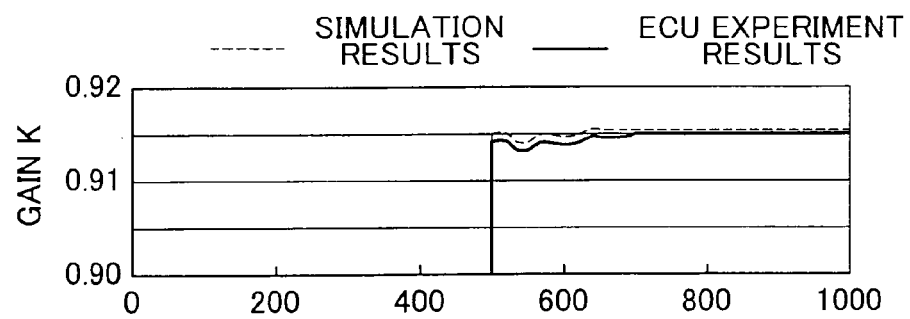
Figure 3C:
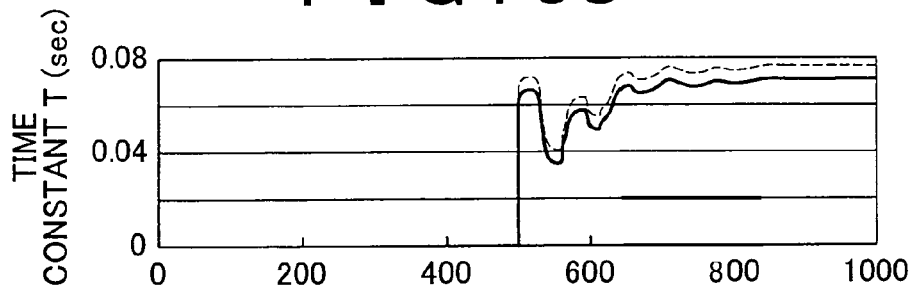
Figure 3D:
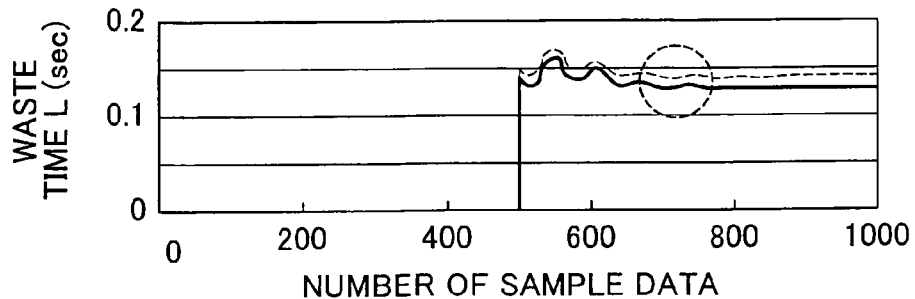

FIGS. 3B, 3C and 3D show transitions of the identified values of the gain K, the time constant T and the waste time L, respectively. Incidentally, with regard to the same input/output data, the interrupted line shows results of a simulation on a personal computer, and the solid line shows results of the calculation actually performed by the ECU 20. The result values, although slightly deviated from each other due to calculation accuracy, are substantially the same.

In the example shown in FIGS. 3A to 3D, the calculation of identified values is started at a time point of acquisition of a total of 500 samples of the input/output data. After that, the identified values for every sample are calculated. Results show that the identified values of about the 700th and later samples are stable (i.e., see an interrupted line FIG. 3D). Therefore, practically, at the time point of acquisition of such a predetermined number of input/output data (e.g., 700 samples) that the identified values begin to stabilize, the ECU 20 calculates the identified values, and compares them with their corresponding abnormality criterion values to carry out the abnormality determination regarding the identified values. The time needed in order to acquire 700 sample data is about 10 seconds. Thus, the abnormality determination regarding the identified values can be carried out within a relatively short time following the start of diagnosis.

In the meantime, an actual engine undergoes various disturbances such as load fluctuations and the like. If these disturbances are not appropriately taken into consideration, the identification accuracy or the robustness cannot be improved. Therefore, in the abnormality diagnosis in accordance with this embodiment, various corrections are performed on the input/output data as described below.

Figure 4:
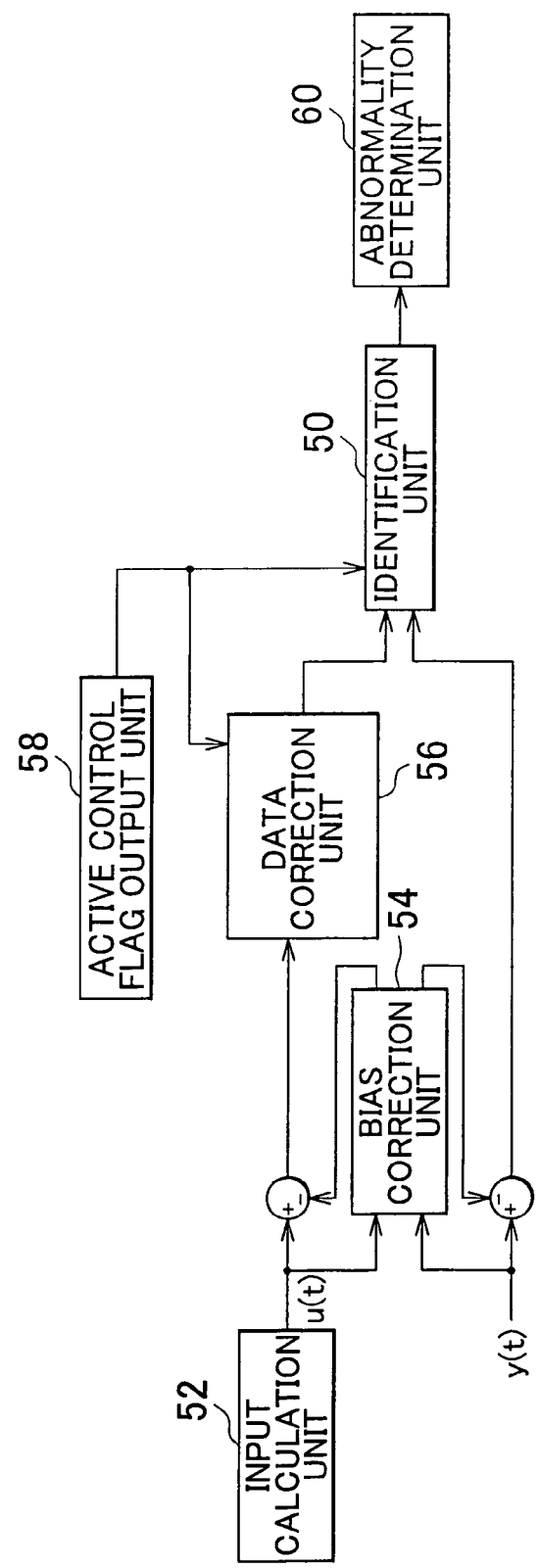
FIG. 4 is a block diagram of an abnormality diagnostic system.

FIG. 4 is a block diagram of an abnormality diagnostic system. This system is constructed in the ECU 20. In order to identify the foregoing parameters K, T and L in an identification unit (identification means) 50, there are provided an input calculation unit (fuel correction means) 52, a bias correction unit (bias correction means) 54, and a data correction unit (delayed sampling means and waste time correction means) 56. In addition, since the abnormality diagnosis is carried out during the active control, an active control flag output unit 58 is also provided. Besides, in order to perform the determination as to the abnormalities on the basis of the parameters K, T and L, an abnormality determination unit (abnormality determination means) 60 is also provided.

The input calculation unit 52 calculates the input u(t). In the foregoing example, the input u(t) is a ratio Ga/Q between the fuel injection amount Q calculated on the basis of the energization time of the injector 12 and the intake air amount Ga calculated on the basis of the output of the air flow meter 5 (i.e., the input air-fuel ratio Ga/Q). However, herein, the fuel injection amount Q calculated on the basis of the injector energization time is corrected on the basis of the wall surface-attached amount of fuel and the evaporation amount of fuel, and the post-correction fuel injection amount Q' is used to calculate the input u(t). That is, u(t)=Ga/Q'. Thus, the input u(t) is corrected on the basis of the wall surface-attached amount and the evaporation amount of fuel.

When fuel is injected from the injector 12, a major portion of the fuel is taken into the in-cylinder combustion chamber 3, but the rest attaches to the wall surface in the intake port and does not enter the combustion chamber 3. In the amount fuel injected from the injector 12 is represented by fi and the fuel attachment rate for all the cylinders is represented by R (<1), the portion of the injected fuel amount fi that attaches to the intake port wall surface is represented by R·fi, and the portion of the amount that enters the combustion chamber 3 is represented by (1−R)·fi.

On the other hand, a portion of the fuel attached to the intake port wall surface enters the combustion chamber 3 during the next intake stroke, but the rest thereof remains and continues being attached. If the amount of fuel attached to the intake port wall surface is represented by fw and the fuel remaining rate for all the cylinders is represented by P (<1), the portion of the wall surface-attached fuel amount fw that continues being attached to the wall surface is represented by P·fw, and the portion: thereof that enters the combustion chamber 3 is represented by (1−P)·fw.

In a four-stroke engine, the period during which the intake stroke, the compression stroke, the expansion stroke, and the exhaust stroke are each completed once is defined as one cycle (i.e., 1 cycle=720° crank angle), and the present cycle is expressed as ks, and the next cycle is expressed as ks+1. Besides, if the amount of fuel that enters the in-cylinder combustion chamber 3 is represented by fc, the following relationship holds.

$$fw(ks+1)=P \cdot fw(ks)+R \cdot fi(ks) \qquad (16)$$

$$fc(ks)=(1-P) \cdot fw(ks)+(1-R) \cdot fi(ks) \qquad (17)$$

The equation (16) means that the wall surface-attached fuel amount fw(ks+1) of the next cycle is represented by the sum of the remaining amount P·fw(ks) of the wall surface-attached fuel amount fw(ks) of the present cycle and the wall surface-attached portion R·fi(ks) of the injected fuel amount fi(ks) of the present cycle. The equation (17) means that the inflow fuel amount fc(ks) that flows into the combustion chamber 3 during the present cycle is represented by the sum of the evaporation amount (1−P)·fw(ks) of the present-cycle wall surface-attached fuel amount fw(ks) and the portion (1−R)·fi(ks) of the present-cycle injected fuel amount fi(ks) that does not attach to the wall surface but flows directly into the combustion chamber 3.

In this manner, at the time of calculation of the input u(t), the value of the inflow fuel amount fc is used as the value of the fuel injection amount Q'. The inflow fuel amount fc is obtained by correcting the amount of fuel injection calculated on the basis of the energization time of the injector 12, on the basis of the wall surface-attached amount and the evaporation amount of fuel. Hence, by using the value of the inflow fuel amount fc for the calculation of the input u(t), the input value can be caused to become a more accurate value that is closer to the actual input value, so that the accuracy of parameter identification can be improved.

Incidentally, as the engine temperature and the intake air temperature are higher, the vaporization of fuel is more promoted, and therefore the fuel attached amount decreases and the fuel evaporation amount increases. Therefore, it is preferable that the remaining fuel rate P and the fuel attachment rate R be a function of at least one of the engine temperature (or water temperature) and the intake air temperature. The correction based on the wall surface-attached amount and the evaporation amount of fuel as described above will be referred to as "fuel dynamics correction".

Figure 5:
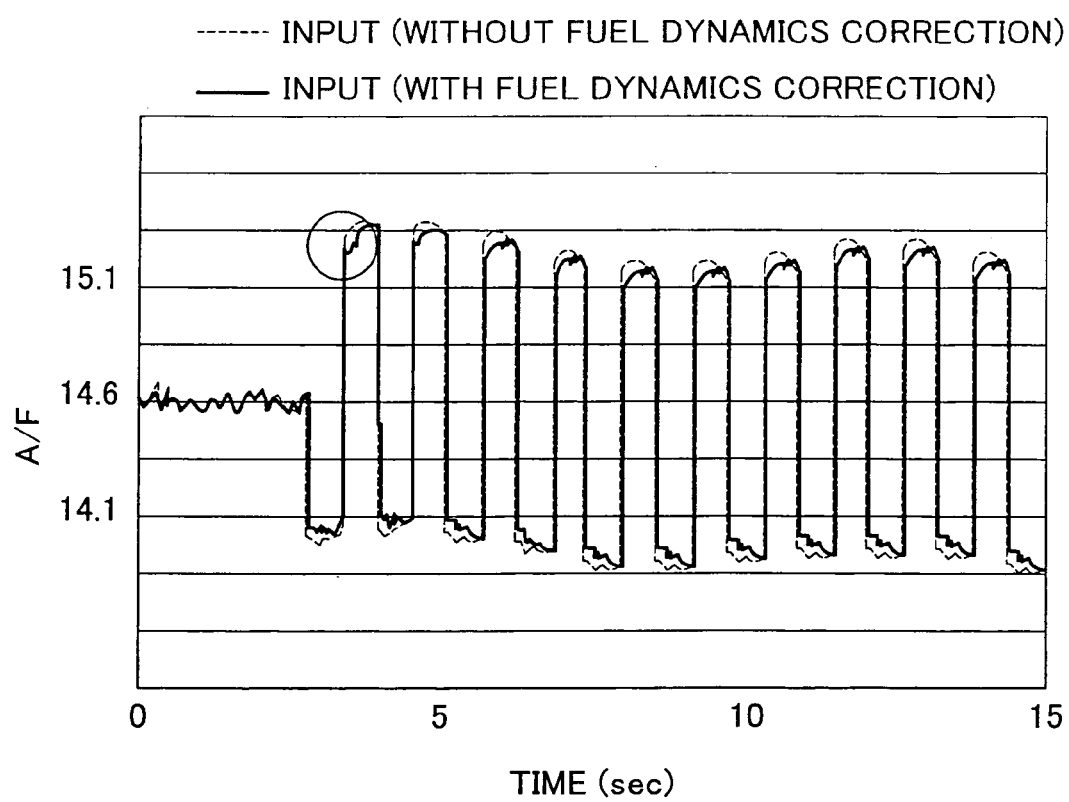
FIG. 5 shows results of a test in which inputs are compared between the cases with and without a fuel dynamics correction.

FIG. 5 shows results of a test in which differences in the changing of the input during the active control between the case without the fuel dynamics correction (interrupted line) and the case with the fuel dynamics correction (solid line) were investigated. As shown by a circle in FIG. 5, in the case with the fuel dynamics correction, the waveform of the input air-fuel ratio tends to be made slightly less sharp immediately after the inversion of the input air-fuel ratio, in comparison with the case without the fuel dynamics correction.

Next, the bias correction unit 54 will be described. In the bias correction unit 54, both the input u(t) and the output y(t) are shift-corrected so as to remove the bias between the input u(t) and the output y(t).

Figure 6:
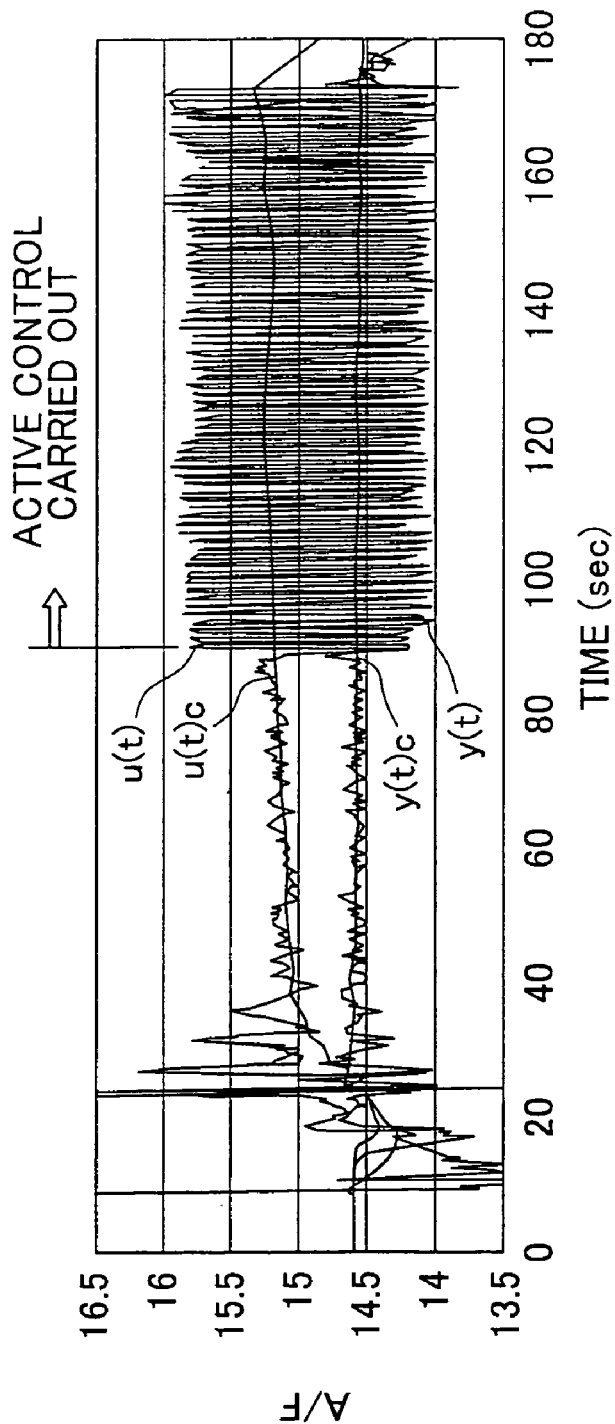
FIG. 6 is shows test results showing the manners of changes in the input and the output during a pre-bias-correction state.

In some cases, one of the input u(t) and the output y(t) may become biased (deviated) relative to the other, to the lean side or the rich side, in association with factors such as load fluctuation, learning deviation, sensor value deviation, etc. FIG. 6 shows test results that show the manner or behavior of the bias. In FIG. 6, u(t)c and y(t)c show the values obtained by passing the input u(t) and the output y(t) through the low-pass filter, respectively, or the moving averages of those values. Since the air-fuel ratio detected by the pre-catalyst sensor 17 is controlled so as to be in the vicinity of the stoichiometric air-fuel ratio (A/F=14.6), the output y(t), which is the value detected by the pre-catalyst sensor 17, fluctuates about the stoichiometric air-fuel ratio, and the value obtained by passing the output y(t) through the low-pass filter or the moving average y(t)c is also kept in the vicinity of the stoichiometric air-fuel ratio. On the other hand, the input u(t) is biased to the lean side in the example shown in FIG. 6 for the foregoing reason.

Figure 7:
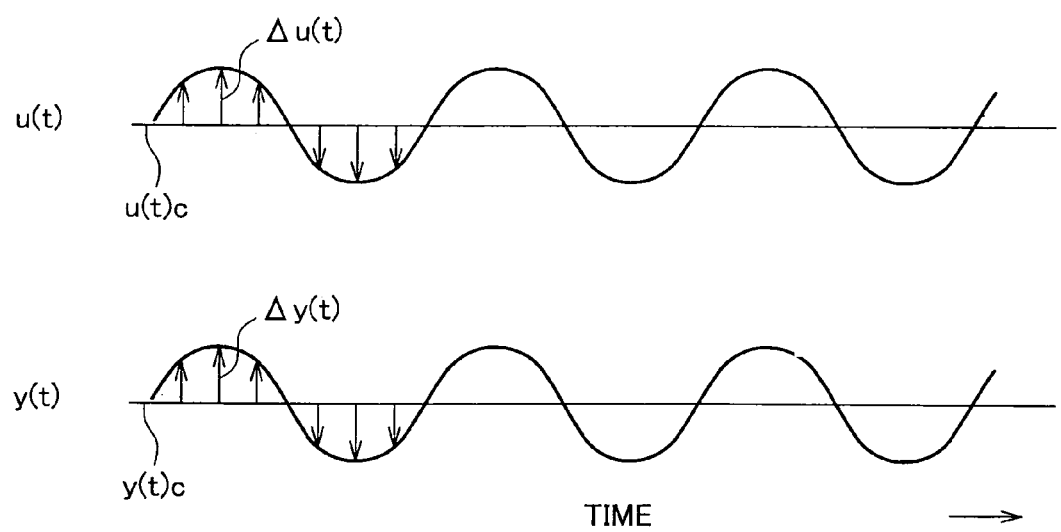
FIG. 7 is a schematic diagram for describing a method of bias correction.

Since it is not preferable to perform the identification in such a biased state, such a correction as to remove the bias is performed. Concretely, as shown in FIG. 7, the data of the input u(t) and the output y(t) are passed through the low-pass filter, or the moving averages thereof are calculated, so as to recursively calculate bias values u(t)c, y(t)c. Then, recursively, the difference Δu(t)(=u(t)−u(t)c) between the input u(t) and its bias value u(t)c, and the difference Δy(t)(=y(t)−y(t)c) between the output y(t) and its bias value y(t)c are calculated. These differences Δu(t), Δy(t) are substituted to zero-based values. In addition, these differences Δu(t), Δy(t) are collectively expressed by ΔA/F.

Figure 8:
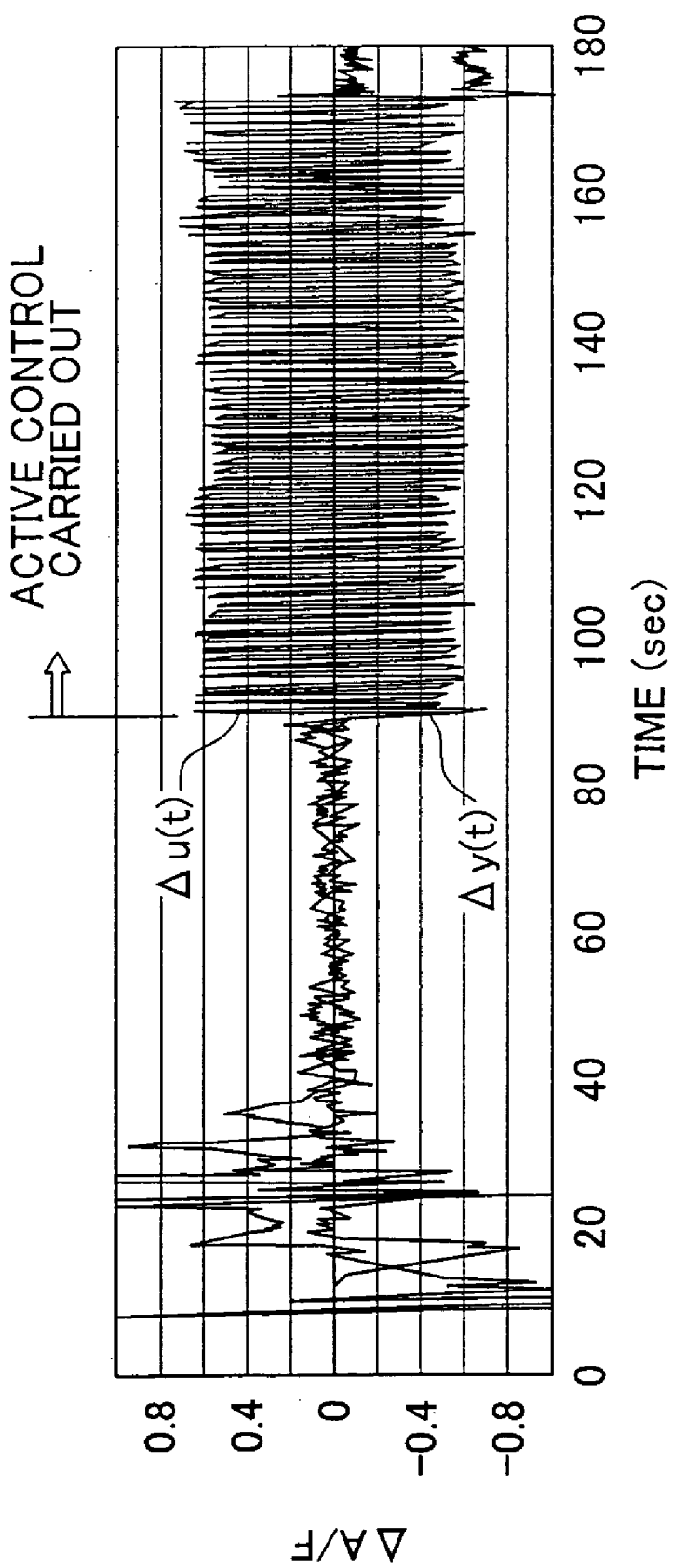
FIG. 8 shows test results showing the manners of changes in the input and the output during a post-bias-correction state.

In this manner, the biases are removed, the post-bias-correction input/output values are changed to zero-based values as shown in FIG. 8. That is, the fluctuation centers of the input u(t) and the output y(t) are adjusted to zero, thus eliminating the influences of load fluctuation, learning deviation, etc. Therefore, the robustness to load fluctuation, learning deviation, etc., can be heightened.

Although the foregoing example adopts the method in which the bias is removed by correcting both the input and the output and adjusting the fluctuation centers of the input and the output to zero, other methods can also be adopted. For example, it is permissible to adopt a method in which only the input is corrected and the fluctuation center thereof is adjusted to the fluctuation center of the output, or only the output is corrected in a similar manner. It suffices that the object of the correction be at least one of the input and the output.

Next, the data correction unit 56 will be described. In the foregoing parameter identification, the real number Laplace transform expression is approximated by the integrated value of a predetermined number of data, as can be understood from the equation (12) shown again below.

$$\begin{aligned} U(\sigma) &= \int_{-\infty}^{\infty} u(t) \cdot e^{-\sigma t} dt \\ &\cong \int_{0}^{\Delta N} u(t) \cdot e^{-st} dt \\ &\cong \sum_{i=1}^{N} u[i] \cdot e^{-\sigma \Delta i} \cdot \Delta \end{aligned} \qquad (12)$$

Figure 9:
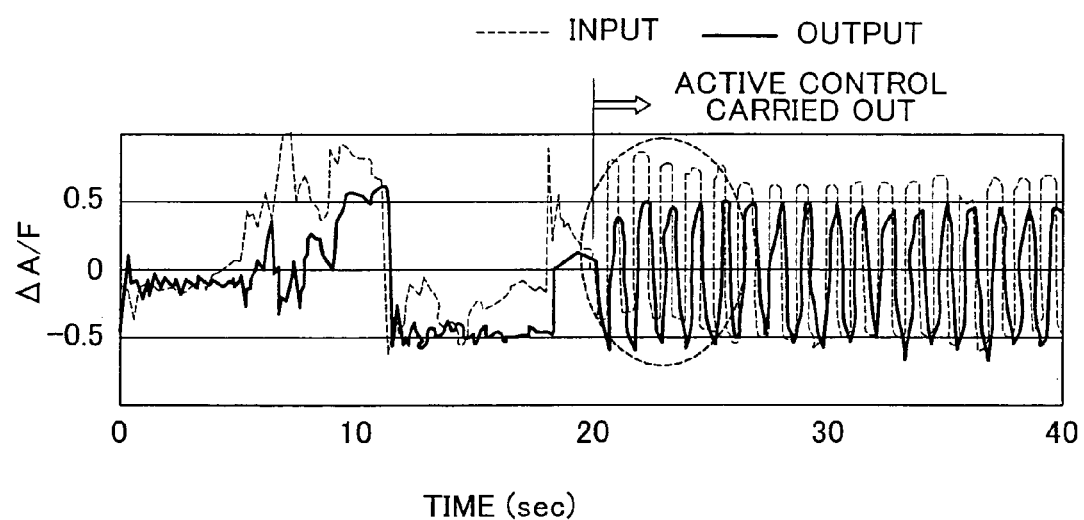
FIG. 9 shows test results showing the input and the output after the bias correction.

In this case, if attention is focused on the envelope coefficient $e^{-\sigma t}$, this value decreases greatly in the beginning and then gradually over time. Therefore, the initial data value immediately following the start of integration greatly affects the identification result. Furthermore, as shown by an interrupted-line circle in FIG. 9, the post-bias-removal-correction input/output data tend to relatively vary and deviate from each other immediately after the start of the active control because the influence of the preceding fluctuation remains. Taking these into consideration, it is feared that early-period input/output data immediately following the start of the active control will adversely affect results of the identification.

Therefore, in view of these respects, the data correction unit 56 performs an operation as follows. Firstly, from the start time of the active control prior to the elapse of a predetermined time, the acquisition and storage of the post-bias-correction input/output data, that is, the sampling thereof, is not executed. From the time point of the elapse of the predetermined time, the sampling is executed (i.e., delayed sampling is executed). Concretely, the sampling is not performed with respect to a predetermined number of data following the start of the active control, and then, the sampling is executed, starting with the data subsequent to the predetermined number of data. Alternatively, instead of or in addition to this, the post-bias-removal-correction input/output data are compared with each other at their oscillation peaks, that is, their rich peaks and/or their lean peaks. From the time point at which the difference between the post-bias-removal-correction input/output data becomes equal to or less than a predetermined value, the sampling is executed. Therefore, early-period data that will adversely affect the identified values can be excluded, and the robustness of the identified values can be improved.

Figure 10A:
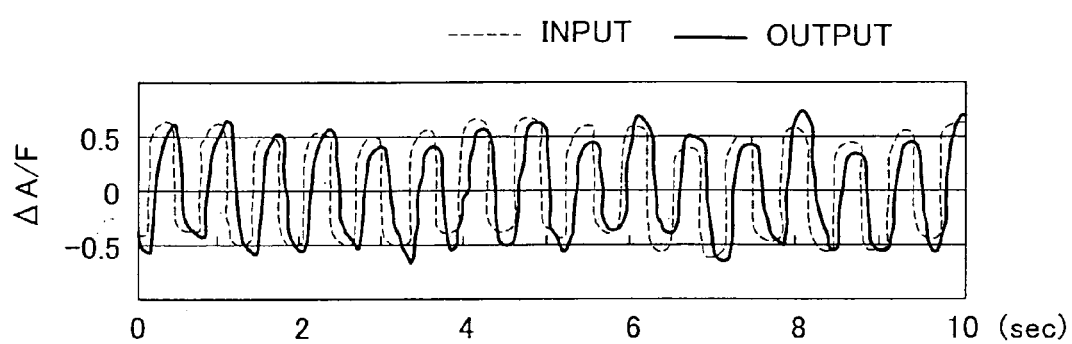
FIG. 10A shows the input and the output before the increase correction.

Incidentally, as is seen in the equation (12), each of u(t) and y(t) can theoretically assume both positive and negative values. However, as shown in FIG. 10A, the post-bias-removal-correction input/output data at the time of the active control fluctuate about 0, and assume values symmetrical with respect to 0. If these values are integrated, the integrated value becomes a small value in the vicinity of 0, and may possibly become susceptible to the influence of noise.

Figure 10B:
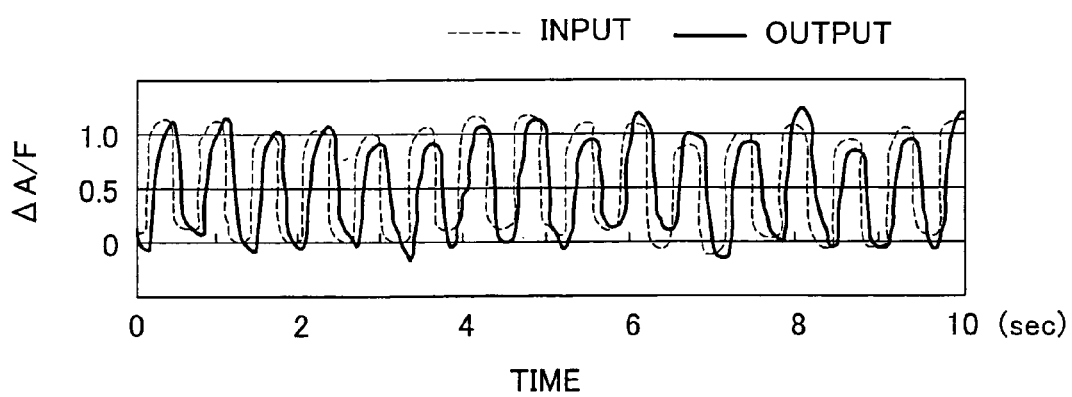
FIG. 10B shows the input and the output after the increase correction.

Therefore, in the data correction unit 56, a predetermined positive value is added uniformly to sampled post-bias-removal-correction input/output data, for increase correction of the data. In this embodiment, 0.5 is uniformly added to the post-bias-removal-correction input/output data as shown in FIG. 10A, so as to obtain input/output data that fluctuate about 0.5 as shown in FIG. 10B. Thus, the integrated value is increased to a value in the vicinity of 0.5, so that the influence of noise can be reduced and the accuracy and the robustness of the identified values can be improved.

Incidentally, although in this embodiment, the data correction unit 56 performs both the delayed sampling and the data increase correction, the data correction unit 56 may also perform only one of the delayed sampling and the data increase correction. FIG. 3A shows input/output data obtained through the delayed sampling and the data increase correction performed by the data correction unit 56.

Figure 11:
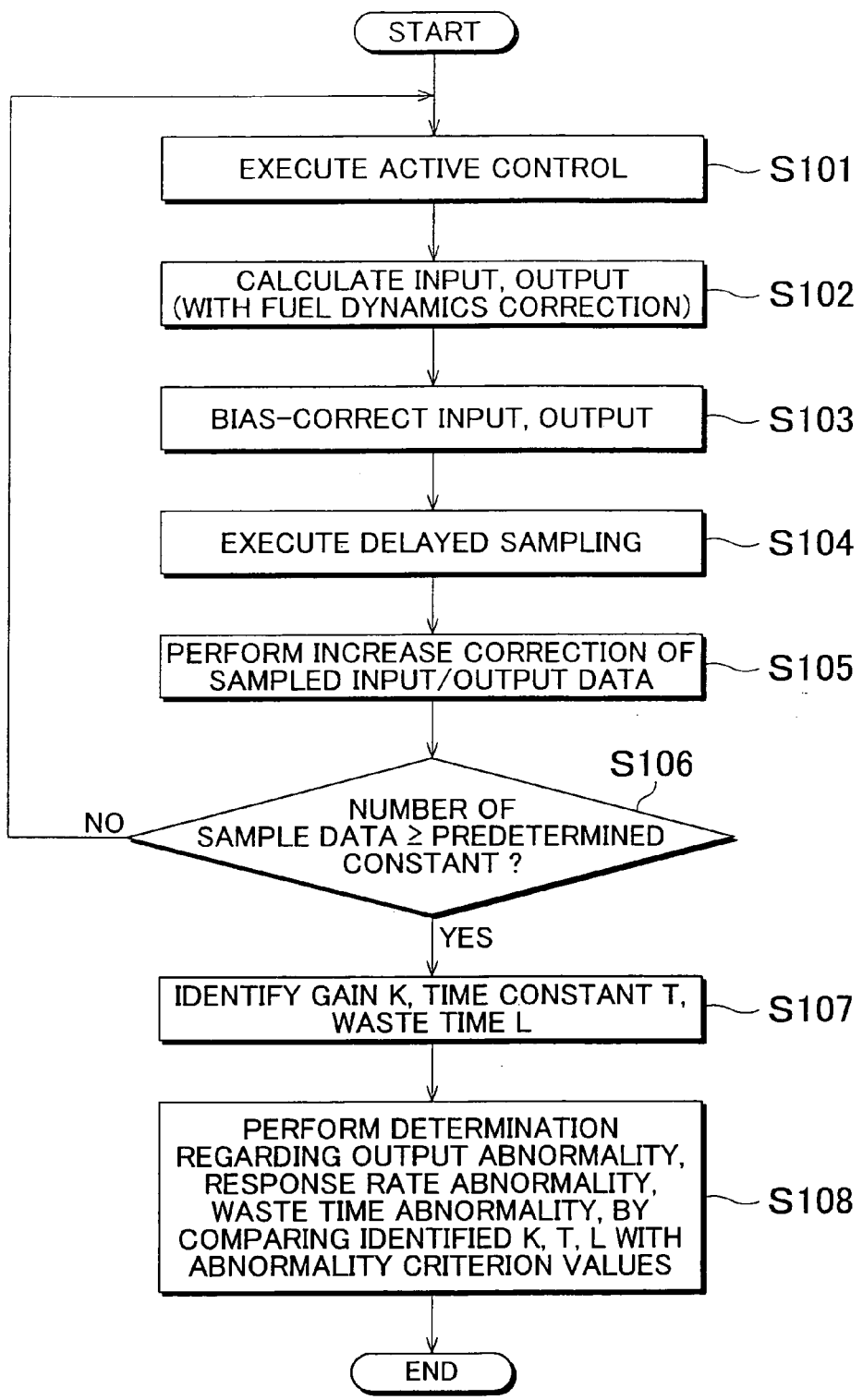
FIG. 11 is a flowchart schematically showing a procedure of an abnormality diagnosis of an air-fuel ratio sensor.

Next, a procedure of the air-fuel ratio sensor abnormality diagnosis that includes all the corrections and processes described above will be described with reference to FIG. 11. Firstly, in step S101, the active control of compulsorily oscillating the input u(t) is executed. In step S102, the input u(t) having been subjected to the fuel dynamics correction is calculated. In step S103, the input u(t) and the output y(t) are bias-corrected so that the bias between the input and the output disappears as shown in FIGS. 6 to 8.

Subsequently in step S104, the delayed sampling is executed. That is, if the present time point (the execution timing of step S104) is prior to the elapse of a predetermined time following the start time of the active control, the sampling of the post-bias-correction input/output data is not executed. On the other hand, if the present time point is at or after the elapse of the predetermined time following the start of the active control, one post-bias-correction input data and one post-bias-correction output data are sampled.

In step S105, the input/output data sampled in step S104 are subjected to the increase correction. Then, the process proceeds to step S106, in which it is determined whether or not the number of sampled input/output data has become equal to or greater than a predetermined number (e.g., 700). If the number of sample data is not greater than or equal to the predetermined number, the process of step S101 to S105 is repeatedly executed. Then, when the number of sampled data becomes equal to or greater than the predetermined number, the process proceeds to the subsequent step, that is, step S107, in which all the post-increase-correction input/output data are used to identify the three parameters, that is, the gain K, the time constant T and the waste time L. Then, in step S108, these identified parameters K, T, L are compared with their corresponding abnormality criterion values (the gain increase abnormality criterion value Ks1, the gain shrink abnormality criterion value Ks2, the time constant abnormality criterion value Ts, the waste time increase, abnormality criterion value Ls1, the waste time shrink abnormality criterion value Ls2), and determination as to the normality/abnormality of the output and the response rate of the pre-catalyst sensor 17 as well as the waste time is made.

While a preferred embodiment of the invention has been described in detail, other various embodiments of the invention are also conceivable: For example, although the above-described internal combustion engine is of an intake port (intake passageway) injection type, the invention is also applicable to direct-injection engines. In this case, since there is no need to take into consideration the fuel attachment to the intake passageway wall surface, the fuel dynamics correction is omitted. Although the foregoing embodiment is applied to a so-called wide-range air-fuel ratio sensor, the invention is also applicable to a so-called $O_2$ sensor, for example, the post-catalyst sensor 18. Sensors in a broad meaning for detecting the air-fuel ratio of exhaust gas, including the aforementioned $O_2$ sensors, are defined as air-fuel ratio sensors in the invention. Although in the foregoing embodiment, the diagnosis of abnormality is performed with respect to two of the characteristics of the air-fuel ratio sensor, that is, the output and the response rate, this is not restrictive. For example, the diagnosis of abnormality may also be performed with respect to one or three or more of the characteristics. Likewise, as for the parameter of the first order response delay element, it is permissible to use only one of the gain K and the time constant T, or use other parameters in addition to the gain K and the time constant T. Although in the foregoing embodiment, a plurality of parameters are simultaneously identified and the determinations about a plurality of abnormalities are simultaneously performed, this is not restrictive. For example, the identifications of a plurality of parameters may also be performed with time differences therebetween, or the determinations regarding a plurality of abnormalities may be performed with time differences therebetween.

Embodiments of the invention are not limited only to the foregoing embodiments, but include all the modifications, applications, and equivalents encompassed in the spirit of the invention, which is defined by the appended claims. Therefore, the invention should not be interpreted in any limiting manner, but can be applied to any art that belongs to the scope of the spirit of the invention.

What is claimed is:

1. An abnormality diagnostic device for an air-fuel ratio sensor that detects an air-fuel ratio of an exhaust gas of an internal combustion engine, comprising:
an Electronic Control Unit (ECU) including:
an identification portion that models a system extending from a fuel injection valve to the air-fuel ratio sensor by using a first order response delay element and a waste time element, and that identifies at least a waste time of the waste time element based on an input given to the air-fuel ratio sensor and an output obtained from the air-fuel ratio sensor; and
an abnormality determination portion that determines whether there is a mis-installation of the air-fuel ratio sensor based on the waste time identified by the identification portion.

2. The abnormality diagnostic device according to claim 1, wherein:
the identification portion also identifies a parameter of the first order response delay element based on the input and the output, and
the abnormality determination portion also determines whether there is an abnormality of a predetermined characteristic of the air-fuel ratio sensor based on the parameter identified by the identification portion.

3. The abnormality diagnostic device according to claim 2, wherein the abnormality determination portion determines whether there are abnormalities of at least two of characteristics of the air-fuel ratio sensor based on at least two parameters identified by the identification portion.

4. The abnormality diagnostic device according to claim 3, wherein
the at least two parameters are a gain and a time constant, and
the at least two of the characteristics of the air-fuel ratio sensor are the output and a response rate.

5. The abnormality diagnostic device according to claim 4, wherein the identification portion simultaneously identifies the waste time of the waste time element, and the gain and the time constant of the first order response delay element.

6. The abnormality diagnostic device according to claim 5, wherein the abnormality determination portion determines whether there is the mis-installation of the air-fuel ratio sensor based on the identified waste time, and simultaneously determines whether there are abnormalities of the output and the response rate of the air-fuel ratio sensor based on the identified gain and the identified time constant.

7. The abnormality diagnostic device according to claim 1, wherein the ECU further includes a bias correction portion that corrects at least one of the input and the output so as to remove a bias between the input and the output.

8. The abnormality diagnostic device according to claim 7, wherein the ECU further includes:
an active control portion that executes an active control of compulsorily oscillating the input; and
a delayed sampling portion that samples post-bias-correction input/output data provided during the active control, starting at a time point of elapse of a predetermined time following a start time of the active control,
wherein the identification portion identifies the waste time based on the input/output data sampled by the delayed sampling portion.

9. The abnormality diagnostic device according to claim 7, wherein the ECU further includes:
an active control portion that executes an active control of compulsorily oscillating the input; and
an increase correction portion that performs an increase correction of post-bias-correction input/output data provided during the active control,
wherein the identification portion identifies the waste time based on the input/output data that is increase-corrected by the increase correction portion.

10. The abnormality diagnostic device according to claim 1, wherein the ECU further includes a fuel correction portion that corrects the input based on a wall surface-attached amount of fuel and an evaporation amount of fuel.

11. An abnormality diagnostic method for an air-fuel ratio sensor that detects an air-fuel ratio of an exhaust gas of an internal combustion engine, comprising:
modeling a system extending from a fuel injection valve to the air-fuel ratio sensor by using a first order response delay element and a waste time element;
identifying at least a waste time of the waste time element based on an input given to the air-fuel ratio sensor and an output obtained from the air-fuel ratio sensor; and
determining whether there is a mis-installation of the air-fuel ratio sensor based on the waste time identified.

12. The abnormality diagnostic method according to claim 11, further comprising:
identifying a parameter of the first order response delay element based on the input and the output; and
determining whether there is an abnormality of a predetermined characteristic of the air-fuel ratio sensor based on the parameter identified.

13. The abnormality diagnostic method according to claim 12, wherein determination is performed of whether there are abnormalities of at least two of characteristics of the air-fuel ratio sensor based on at least two parameters identified.

14. The abnormality diagnostic method according to claim 13,
wherein the at least two parameters are a gain and a time constant, and
the at least two of the characteristics of the air-fuel ratio sensor are the output and a response rate.

15. The abnormality diagnostic method according to claim 14, wherein the waste time of the waste time element, and the gain and the time constant of the first order response delay element, are simultaneously identified.

16. The abnormality diagnostic method according to claim 15, wherein the determining whether there is the abnormality of the mis-installation of the air-fuel ratio sensor based on the identified waste time, and the determining whether there are abnormalities of the output and the response rate of the air-fuel ratio sensor based on the identified gain and the identified time constant, are performed simultaneously.

17. The abnormality diagnostic method according to claim 11, further comprising
correcting at least one of the input and the output so as to remove a bias between the input and the output.

18. The abnormality diagnostic method according to claim 17, further comprising:
executing an active control of compulsorily oscillating the input; and
sampling post-bias-correction input/output data provided during the active control, starting at a time point of elapse of a predetermined time following a start time of the active control, wherein the waste time is identified based on the input/output data sampled.

19. The abnormality diagnostic method according to claim 17, further comprising:

executing an active control of compulsorily oscillating the input; and performing an increase correction of post-bias-correction input/output data provided during the active control, wherein the waste time is identified based on the input/output data that is increase-corrected.

20. The abnormality diagnostic method according to claim 11, further comprising:

correcting the input based on a wall surface-attached amount of fuel and an evaporation amount of fuel.

* * * * *